No. 891,019. PATENTED JUNE 16, 1908.
L. VERNA.
DRYING ROOM.
APPLICATION FILED OCT. 22, 1907.
2 SHEETS—SHEET 1.
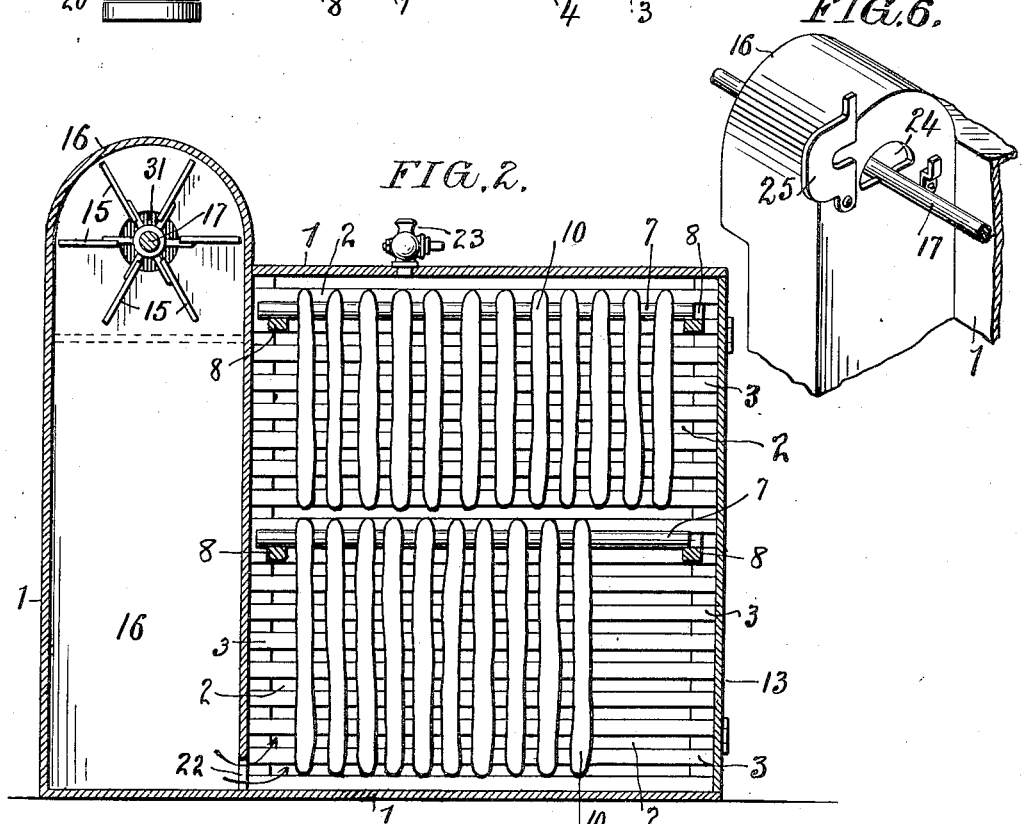
Witnesses:
N. R. Cleland
Hugh McManus, Jr.
Inventor:
Luigi Verna
By his Attorney
F. DeWitt Goodwin No. 891,019. PATENTED JUNE 16, 1908.
L. VERNA.
DRYING ROOM.
APPLICATION FILED OCT. 22, 1907.
2 SHEETS—SHEET 2.
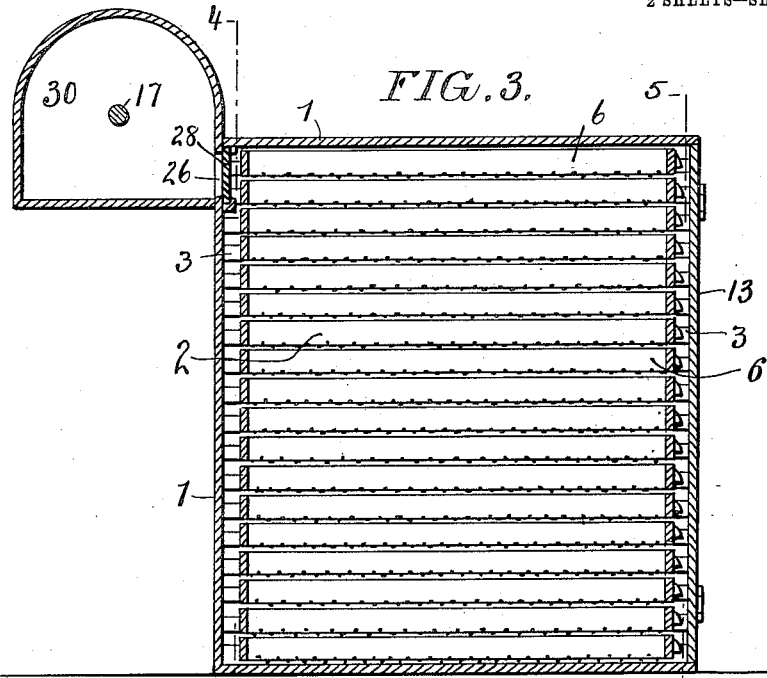
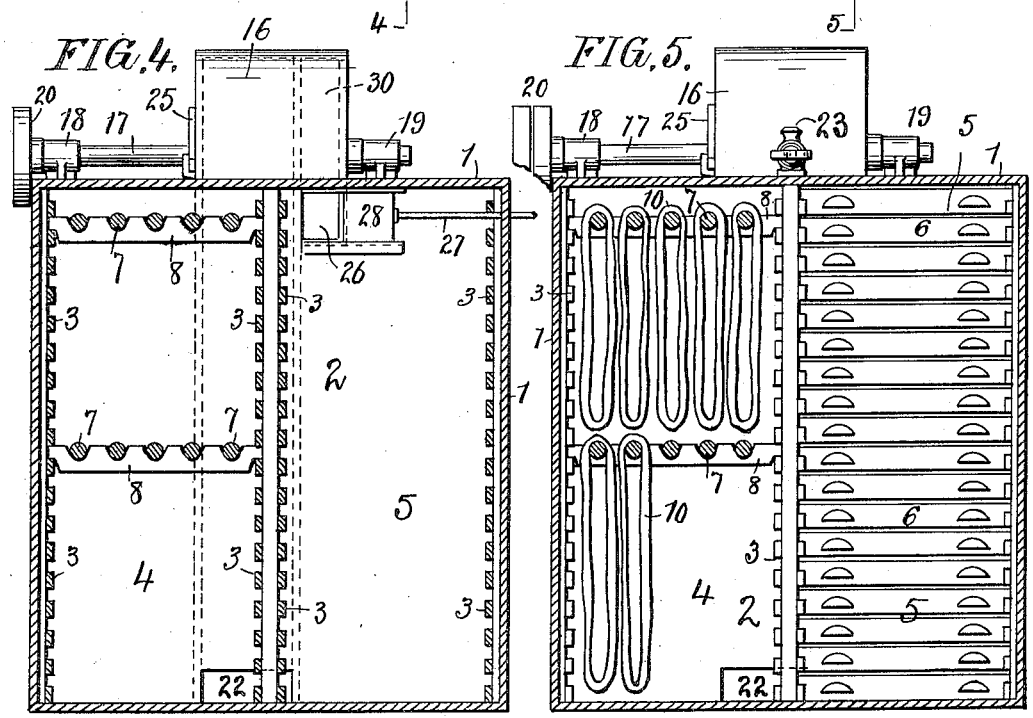
Witnesses:
M. R. Cleland
Hugh McAnany, Jr.
Inventor:
Luigi Verna
By his Attorney
G. DeWitt Goodwin

UNITED STATES PATENT OFFICE.

LUIGI VERNA, OF PHILADELPHIA, PENNSYLVANIA.

DRYING-ROOM.

No. 891,019.                Specification of Letters Patent.          Patented June 16, 1908.

Application filed October 22, 1907. Serial No. 398,611.

*To all whom it may concern:*

Be it known that I, LUIGI VERNA, a citizen of the United States, residing at Philadelphia, in the county of Philadelphia and State of Pennsylvania, have invented certain new and useful Improvements in Drying-Rooms, of which the following is a specification.

My invention relates to improvements in a drying machine and particularly relates to a machine for drying alimentary paste or dough used in the manufacture of macaroni.

The object of my invention is to construct a drying machine in which the dough can be quickly dried without causing the surface or crust of the dough to crack, this I accomplish by constructing the drying machine so that the dough may be subjected to an atmospheric pressure which will dry the dough uniformly without causing the surface to crack; a further object of my invention is to provide means for causing the air in the drying machine to circulate and also for admitting fresh air to the same when desired; these together with other novel features of construction of the parts of the machine, which will be more fully hereinafter described, constitute my invention.

Referring to the drawings: Figure 1. is a plan view of my improved drying machine showing the fan box in section; Fig. 2. is a vertical section on line 2—2 Fig. 1; Fig. 3. is a vertical section on line 3—3 Fig. 1; Fig. 4. is a vertical section on line 4—4 Fig. 3; Fig. 5. is a vertical section on line 5—5 Fig. 3;
and, Fig. 6. is a perspective view of the fan box.

In the drawings 1 represents a casing forming the drying chamber 2, said casing 1 is preferably rectangular in form and is provided with racks 3 which divide the drying chamber into different compartments 4 and 5 into which compartments may either be placed the drawers 6, or poles 7, supported upon racks or guides 8, provided for that purpose. The drawers have bottoms formed of wire mesh, upon which is placed the short pieces of dough. The dough is also dried in long coils, such as shown at 10. These coils of dough are hung upon the poles 7, which are suspended between the said cross-pieces 8, which in turn rest upon the racks 3. The said cross-pieces 8 are removable, so that either the drawers 6 or the poles 7 may be used in any of the compartments as desired.

The drying machine is provided with large doors 12 and 13, so as to make the interior of the drying chamber accessible.

The drying machine is provided with a fan 15, mounted in a fan box 16. A shaft 17, supported in bearings 18 and 19, carries the said fan and is driven by the belt wheels 20, or any other suitable means.

The fan box 16 extends to the bottom of the drying machine, where the air from the fan passes through the aperture 22 into the drying chamber, which is practically air tight, so that the air will be held under a sufficient pressure to uniformly dry the dough contained in the drawers or suspended upon the poles.

A stop-cock 23 is provided at the top of the drying machine, which may be opened to reduce the air pressure in the drying chamber when desired.

The fan box is provided with a centrally located opening 24 having an adjustable cover 25, as shown in Fig. 6; which may be opened to admit fresh air to the fan.

When it is desired to cause the air in the drying chamber to circulate, the aperture 26, formed at the top of the drying chamber, as shown in Figs. 3 and 4, is opened by means of the rod 27, which is connected with a sliding door 28, adapted to tightly close said aperture 26. When said aperture 26 is opened the air will be drawn from the top of the drying chamber into the return chamber 30, from which it is drawn, through the opening 31, into the fan box 16. The cover 25, of the fan box may be closed so that the air in the drying chamber will circulate, or the cover may be opened to admit fresh air as desired.

Having thus described my invention I claim and desire to secure by Letters Patent:

In a drying room, the combination of a casing forming a drying chamber, a fan box located adjacent said drying chamber and having an aperture formed therein for admitting air to the lower portion of said drying chamber, a fan in said fan box, said drying chamber having an aperture formed in the upper portion thereof, a return chamber communicating with said aperture in the upper portion of said drying chamber and with said fan box, means for closing said last mentioned aperture, racks formed in said drying chamber and means supported upon said racks for carrying the articles to be dried.

In testimony whereof I affix my signature in presence of two witnesses.

LUIGI VERNA.

Witnesses:
 JOSEPH B. LANNING,
 J. F. G. ATTLIN.